US009576591B2

(12) United States Patent
Kim

(10) Patent No.: US 9,576,591 B2
(45) Date of Patent: Feb. 21, 2017

(54) ELECTRONIC APPARATUS AND CONTROL METHOD OF THE SAME

(71) Applicant: Samsung Electronics Co., Ltd., Suwon-si (KR)

(72) Inventor: Tae-Hong Kim, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 14/023,852

(22) Filed: Sep. 11, 2013

(65) Prior Publication Data

US 2014/0095177 A1 Apr. 3, 2014

(30) Foreign Application Priority Data

Sep. 28, 2012 (KR) ........................ 10-2012-0108804

(51) Int. Cl.

*G10L 15/22* (2006.01)
*G10L 21/06* (2013.01)
*G08C 17/02* (2006.01)
*G08C 23/04* (2006.01)

(52) U.S. Cl.

CPC ............... *G10L 21/06* (2013.01); *G08C 17/02* (2013.01); *G08C 23/04* (2013.01); *G08C 2201/31* (2013.01); *G10L 2015/223* (2013.01)

(58) Field of Classification Search

CPC ........ G10L 15/265; G10L 15/22; G10L 15/30; G10L 21/06; G06F 3/16; H04M 2201/40; G08C 2201/31; G08C 23/04; G08C 17/02

See application file for complete search history.

(56) References Cited

U.S. PATENT DOCUMENTS 5,936,662 A * 8/1999 Kim ........................ H04N 7/152 348/14.09
6,535,854 B2 * 3/2003 Buchner ............. H04L 12/2803 340/4.4
7,136,817 B2 * 11/2006 Schroder ................. G10L 17/00 704/270
7,139,716 B1 * 11/2006 Gaziz .................. H04L 12/2803 704/231
7,873,466 B2 * 1/2011 Kong ...................... G10L 15/26 701/443

(Continued)

FOREIGN PATENT DOCUMENTS

EP 1217608 6/2002
EP 2 189 977 A2 5/2010

(Continued)

OTHER PUBLICATIONS

European Search Report dated Dec. 10, 2013 issued in corresponding European Patent Application 13185080.2.

*Primary Examiner* — Fariba Sirjani
(74) *Attorney, Agent, or Firm* — Staas & Halsey LLP

(57) ABSTRACT

An electronic apparatus includes a voice acquirer which receives a first voice, a voice processor which processes a voice signal, a communication unit which communicates with at least one external electronic apparatus and receives information on at least one second voice, and a controller which determines whether the first voice is a user's command based on the information on at least one second voice transmitted by the communication unit, and if the first voice is not the user's command, does not perform an operation according to the first voice.

16 Claims, 8 Drawing Sheets

(56) References Cited

U.S. PATENT DOCUMENTS

| | | | | | |
|---|---|---|---|---|---|
| 7,885,818 | B2 * | 2/2011 | Vignoli | G10L 15/26 | 704/246 |
| 8,260,618 | B2 * | 9/2012 | Mahlbacher | G08C 17/02 | 379/88.13 |
| 8,549,578 | B2 * | 10/2013 | Herigstad | H04N 7/163 | 725/109 |
| 8,797,465 | B2 * | 8/2014 | Hardacker | H04N 5/44582 | 348/734 |
| 8,886,125 | B2 * | 11/2014 | Agrawal | H04W 76/023 | 455/41.1 |
| 9,215,509 | B2 * | 12/2015 | Belz | H04L 12/2803 | |
| 2002/0069066 | A1 * | 6/2002 | Crouch | G06Q 10/10 | 704/270.1 |
| 2002/0133352 | A1 * | 9/2002 | Hinde | G10L 15/26 | 704/270.1 |
| 2002/0161572 | A1 * | 10/2002 | Kusumoto | G08C 19/28 | 704/201 |
| 2003/0014261 | A1 * | 1/2003 | Kageyama | G10L 15/26 | 704/275 |
| 2005/0096753 | A1 * | 5/2005 | Arling | G05B 15/02 | 700/11 |
| 2005/0216271 | A1 * | 9/2005 | Konig | G10L 15/22 | 704/275 |
| 2007/0121815 | A1 * | 5/2007 | Clark | H04M 3/42204 | 379/88.03 |
| 2007/0282611 | A1 * | 12/2007 | Kaneko | H04N 5/4403 | 704/275 |
| 2008/0140400 | A1 * | 6/2008 | Blass | G10L 15/22 | 704/246 |
| 2008/0144864 | A1 * | 6/2008 | Huon | H04R 1/20 | 381/305 |
| 2008/0300886 | A1 * | 12/2008 | Patch | 704/275 | |
| 2009/0076827 | A1 * | 3/2009 | Bulitta | 704/275 | |
| 2009/0192801 | A1 | 7/2009 | Chou | | |
| 2010/0208631 | A1 * | 8/2010 | Zhang | H04L 5/14 | 370/297 |
| 2010/0268533 | A1 * | 10/2010 | Park | G10L 25/78 | 704/233 |
| 2010/0278357 | A1 * | 11/2010 | Hiroe | G10L 21/0272 | 381/111 |
| 2011/0169654 | A1 * | 7/2011 | Ketari | G08B 13/1427 | 340/687 |
| 2011/0184735 | A1 * | 7/2011 | Flaks | G10L 17/00 | 704/240 |
| 2011/0201302 | A1 * | 8/2011 | Hatton | G08G 1/205 | 455/404.2 |
| 2011/0282673 | A1 * | 11/2011 | Di Profio | G06F 3/017 | 704/275 |
| 2011/0300840 | A1 * | 12/2011 | Basir | G10L 15/265 | 455/416 |
| 2012/0189140 | A1 * | 7/2012 | Hughes | H04M 3/56 | 381/123 |
| 2012/0226502 | A1 * | 9/2012 | Ouchi | H04N 5/4403 | 704/275 |
| 2012/0257111 | A1 * | 10/2012 | Tanaka | H04N 21/435 | 348/564 |
| 2012/0271640 | A1 * | 10/2012 | Basir | H04M 1/72552 | 704/275 |
| 2013/0021362 | A1 * | 1/2013 | Sakurada | G06F 3/038 | 345/589 |
| 2013/0041665 | A1 * | 2/2013 | Jang | H04N 21/42203 | 704/246 |
| 2014/0357251 | A1 * | 12/2014 | Forutanpour | H04M 1/6008 | 455/418 |
| 2014/0371816 | A1 * | 12/2014 | Matos | A61N 1/3727 | 607/59 |
| 2015/0065114 | A1 * | 3/2015 | Dua | G06F 17/30058 | 455/418 |
| 2015/0106089 | A1 * | 4/2015 | Parker | G06F 1/3206 | 704/235 |
| 2015/0199320 | A1 * | 7/2015 | Ho | G06F 3/017 | 715/233 |
| 2016/0241978 | A1 * | 8/2016 | Goldstein | H04R 25/70 | |

FOREIGN PATENT DOCUMENTS

| | | |
|---|---|---|
| JP | 2003-223188 | 8/2003 |
| KR | 10-2001-0081857 | 8/2001 |
| KR | 10-2005-0021694 | 3/2005 |
| KR | 10-2005-0054399 | 6/2005 |

* cited by examiner

ELECTRONIC APPARATUS AND CONTROL METHOD OF THE SAME

CROSS-REFERENCE TO RELATED APPLICATIONS

This application claims priority benefit from Korean Patent Application No. 10-2012-0108804, filed on Sep. 28, 2012 in the Korean Intellectual Property Office, the disclosure of which is incorporated herein by reference.

BACKGROUND

1. Field

Apparatuses and methods consistent with exemplary embodiments relate to an electronic apparatus and a control method of the same, and more particularly, to an electronic apparatus and a control method of the same which is capable of performing an operation according a voice command.

2. Description of the Related Art

When a user gives a voice command to a particular electronic apparatus that the user wish to control in an environment in which a plurality of electronic apparatuses that may recognize the user's voice command, the electronic apparatuses to which the voice command is not intended to be received, may unintentionally recognize the voice command, execute the voice command, and perform an unintended operation. For example, during a voice call through a mobile phone, some of calling voices may be input to an adjacent electronic apparatus and misunderstood as a voice command. Further, some of broadcasting sound output by a television (TV), may be input to an adjacent electronic apparatus and misunderstood as a voice command and cause the electronic apparatus to perform an unintended operation.

SUMMARY

Additional aspects and/or advantages will be set forth in part in the description which follows and, in part, will be apparent from the description, or may be learned by practice of the invention.

Accordingly, one or more exemplary embodiments provide an electronic apparatus and a control method of the same which reduces misunderstanding of, and malfunction to, a voice command of a plurality of electronic apparatuses which may recognize a voice command, and increases a voice recognition rate.

The foregoing and/or other aspects may be achieved by providing an electronic apparatus including a voice acquirer which receives a first voice; a voice processor which processes a voice signal, a communication unit which communicates with at least one external electronic apparatus and receives information on at least one second voice, and a controller which determines whether the first voice is a user's command based on the information on at least one second voice transmitted by the communication unit, and if the first voice is not the user's command, does not perform an operation according to the first voice.

Also, the communication unit may further include a second communication unit for a voice call, and the controller transmits voice information based on the voice input through the voice acquirer to the at least one external electronic apparatus through the communication unit when a voice call is made through the second communication unit.

Also, the electronic apparatus may further include a display unit which displays an image thereon, and a voice output unit which outputs a voice corresponding to the image, and if the voice is output through the voice output unit corresponding to the image, the controller transmits voice information corresponding to the output voice to the at least one external electronic apparatus through the communication unit.

Also, the controller may determine whether a voice input through the voice acquirer is a user's command granting a right to control the at least one external electronic apparatus, and transmits information to the at least one external electronic apparatus to notify that the controller has obtained the control right to the at least one external electronic apparatus according to a determination result.

Also, the controller may determine whether a voice, which has been input through the voice acquirer after the controller has obtained the control right, is a voice command with respect to one of the at least one external electronic apparatus and transmits the voice command to the at least one external electronic apparatus according to a determination result.

Also, upon receiving information notifying that one of the at least one external electronic apparatus has obtained the control right through the communication unit, the controller may determine that the voice which has been acquired by the voice acquirer is not a user's command.

Also, the communication unit may receive determination result information on at least one second voice from the at least one external electronic apparatus, and the controller determines whether the voice input through the voice acquirer is a user's command, based on the determination information.

Also, the controller may determine whether the first voice is a user's command based on a distance between a user's location and the electronic apparatus and the at least one external electronic apparatus.

Also, the controller may determine whether the first voice is a user's command based on an angle between a user's location and a location of the electronic apparatus.

The foregoing and/or other aspects may be achieved by providing a control method of an electronic apparatus including receiving information on at least one second voice from at least one external electronic apparatus, receiving a first voice, determining whether the first voice is a user's command based on information on the at least one second voice, and not performing an operation according to the first voice if the first voice is not a user's command.

Also, the control method may further include performing communication for a voice call; and transmitting information on a calling voice input during the communication for the voice call to the at least one external electronic apparatus.

Also, the control method may further include processing and displaying an image signal and processing and outputting a voice signal corresponding to the image signal; and transmitting voice information corresponding to the output voice to the at least one external electronic apparatus.

Also, the control method may further include determining whether the voice input to the electronic apparatus is a user's command granting a right to control the at least one external electronic apparatus; and transmitting information notifying that the electronic apparatus has obtained a control right to the at least one external electronic apparatus if the voice has been determined to be the user's command granting the control right.

Also, the control method may further include determining whether a voice input to the electronic apparatus after the information notifying that the electronic apparatus has obtained the control right is a voice command to one of the at least one external electronic apparatus; and transmitting the voice command to a corresponding external electronic apparatus or performing a voice command by the electronic apparatus, according to the determination result.

Also, the control method may further include receiving information notifying that one of the at least one external electronic apparatus has obtained the control right; and not performing an operation according to a voice that is input after the information notifying that the obtained control right is received.

Also, the control method may further include receiving determination result information on at least one second voice from the at least one external electronic apparatus; and determining whether the voice input to the electronic apparatus is a user's command, based on the received at least one determination result information.

Also, the determining whether the first voice is the user's command may further include determining whether the first voice is a user's command based on a distance between a user's location and a location of the electronic apparatus and the at least one external electronic apparatus.

Also, the determining whether the first voice is the user's command may include determining whether the first voice is a user's command, based on an angle between a user's location and a location of the electronic apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
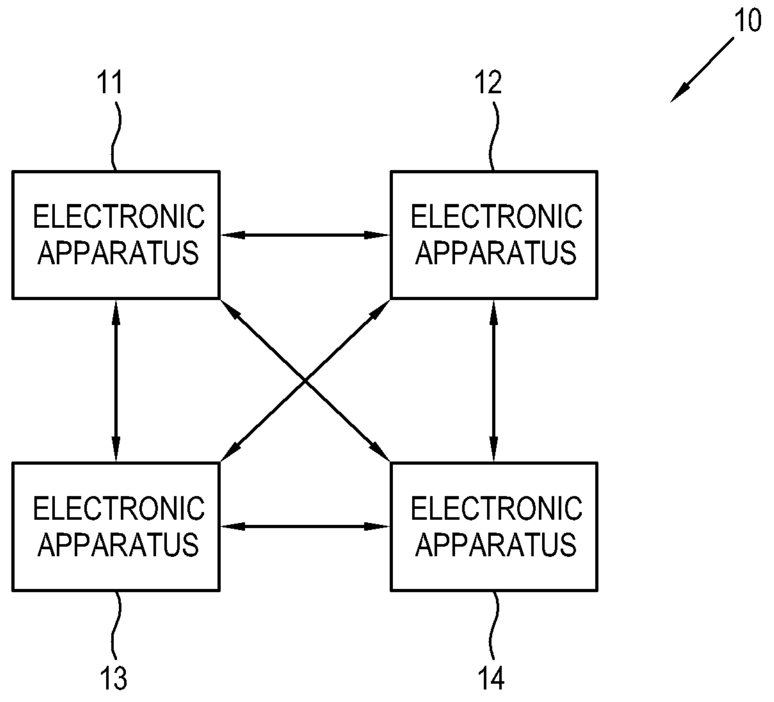
FIG. 1 is a block diagram of a plurality of electronic apparatuses which is capable of performing mutual communication according to an embodiment.

Below, one or more exemplary embodiments will be described in detail with reference to accompanying drawings so as to be easily realized by a person having ordinary knowledge in the art. One or exemplary embodiments may be embodied in various forms without being limited to one or exemplary embodiments set forth herein. Descriptions of well-known parts are omitted for clarity, and like reference numerals refer to like elements throughout.

Figure 2:
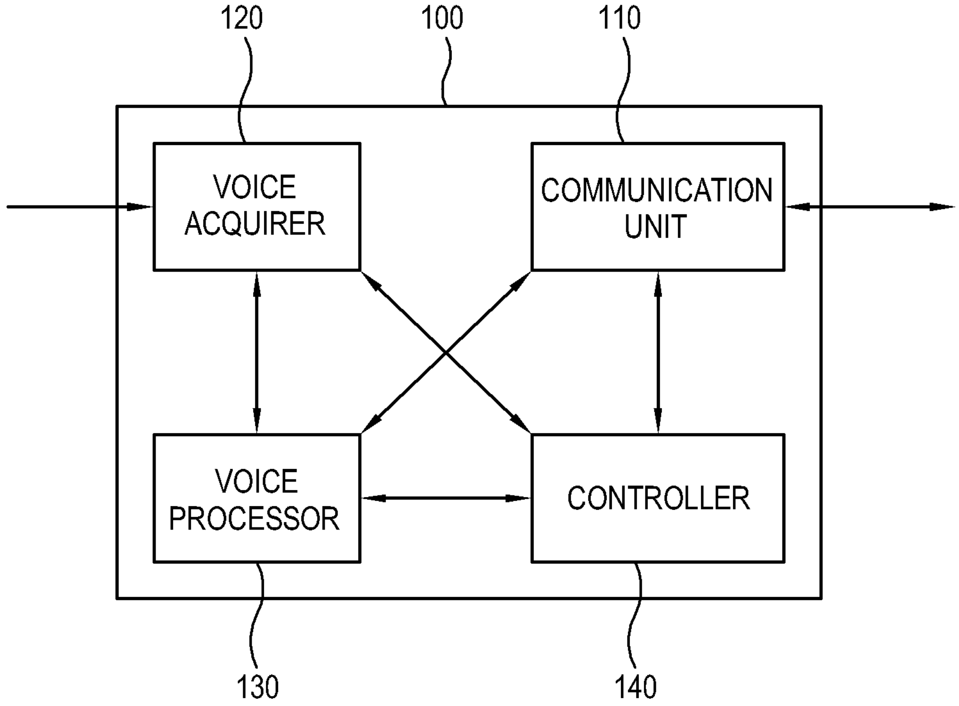
FIGS. 2 to 4 are block diagrams of an electronic apparatus according to an embodiment.

FIG. 1 illustrates an electronic apparatus system including a plurality of electronic apparatuses which is capable of performing mutual communication according to an embodiment. FIG. 2 is a block diagram showing a configuration of the plurality of electronic apparatuses in FIG. 1.

As shown in FIGS. 1 and 2, an electronic apparatus system 10 includes a plurality of electronic apparatuses 11, 12, 13 and 14. The plurality of electronic apparatuses 11, 12, 13 and 14 is connected to one another through various wired and/or wireless networks for mutual communication, and includes a voice recognition engine to perform a user's voice command, respectively. For example, in a wireless connection, the electronic apparatus system 10 may synchronize time of the plurality of electronic apparatuses 11, 12, 13 and 14 through a period beacon signal. In another example, in a wired connection, the electronic apparatus system 10 may synchronize the time by exchanging time information.

As a non-limiting example, the electronic apparatus system 10 in FIG. 1 includes four electronic apparatuses 11, 12, 13 and 14, but the number of the electronic apparatuses included in the electronic apparatus system 10 according to an embodiment is not limited to the foregoing.

Electronic apparatuses 100, 200, 300, 11, 12, 13, and 14 according to an embodiment include home appliances such as a TV, a set-top box, a mobile phone, an air conditioner, a computer, etc. However, any other electronic apparatuses which have a voice recognition capability may be used.

The electronic apparatus 100 includes a communication unit 110, a voice acquirer 120, a voice processor 130 and a controller 140.

The communication unit 110 includes, for example, wired/wireless LAN, infrared (IR) communication, radio frequency (RF), BLUETOOTH, ZIGBEE, etc., and exchanges data with an external electronic apparatus. However, the communication unit may use other method of exchanging data with an external electronic apparatus.

The voice acquirer 120 receives a user's voice through an input device such as a microphone. The voice acquirer 120 may receive the user's voice and recognize the received user's voice as a user's voice command, and may perform a corresponding operation according to the user's voice command, or if the received voice is not recognized as a user's voice command, a normal voice calling is performed.

The voice acquirer 120 may further include a voice preprocessing unit (not shown) to filter noises of input voice. Various methods of filtering noises may be used to filter the noise from the input voice.

The voice processor 130 is implemented as voice recognition engine to process a user's voice command from the voice acquirer 120 or voice data transmitted through the communication unit 110. Various methods of recognizing voice may be used to filter the noise from the input voice.

The controller 140 controls the communication unit 110, the voice acquirer 120 and the voice processor 130, and controls the foregoing components to perform operations corresponding to a user's command.

The controller 140 receives information on at least one second voice through the communication unit 110 from an external electronic apparatus. Upon receiving a first voice from the voice acquirer 120, the controller 140 determines whether the first voice is a user's command, based on the information on at least one second voice transmitted through the communication unit 110. If it is determined that the first voice is not a user's command, the controller 140 does not perform an operation according to the first voice.

For example, if an external electronic apparatus is a television (TV) which outputs an image including a broadcasting signal, and a voice such as audio sound corresponding to the image, second voice information corresponding to the output voice may be transmitted by the TV through the communication unit 110. A first voice may be also transmitted by the voice acquirer 120.

The controller 140 determines a degree of similarity between information on the second voice corresponding to audio sound of the TV and the first voice input through the voice acquirer 120. If it is determined that there is a predetermined similarity between the information on the second voice and the first voice, the controller 140 determines that the first voice is not a user's command and does not perform a corresponding operation.

For example, if an audio sound output by a TV as an external electronic apparatus is input through the voice acquirer 120, the controller 140 determines that the audio sound is not a user's command and prevents a malfunction of the electronic apparatus.

The controller 140 determines a degree of similarity between the first voice input through the voice acquirer 120 and information on the second voice transmitted through the communication unit 110. If it is determined that there is no predetermined similarity therebetween, the controller 140 determines that the first voice is a user's command. Accordingly, the controller 140 controls the voice processor 130 to recognize the first voice, and performs the user's command corresponding to the recognized result.

For example, if an external electronic apparatus is a mobile phone which currently performs a voice calling operation, second voice information corresponding to a calling voice input through the mobile phone may be transmitted through the communication unit 110. Also, the first voice may be transmitted by the voice acquirer 120.

The controller 140 determines a degree of similarity between information on the second voice corresponding to the calling voice input to the mobile phone and the first voice input through the voice acquirer 120. If it is determined that there is a predetermined similarity therebetween, the controller 140 determines that the first voice is not a user's command and does not perform the corresponding operation.

For example, if a calling voice output during a voice call through a mobile phone is input through the voice acquirer 120, the controller 140 determines that the voice is not a user's command, and prevents a malfunction of the electronic apparatus 100.

The controller 140 determines a degree of similarity between the first voice input through the voice acquirer 120 and information on the second voice transmitted through the communication unit 110. If it is determined that there is no predetermined similarity therebetween, the controller 140 determines that the first voice is a user's command. Accordingly, the controller 140 controls the voice processor 130 to recognize the first voice, and performs a user's command corresponding to the recognized result.

Figure 3:
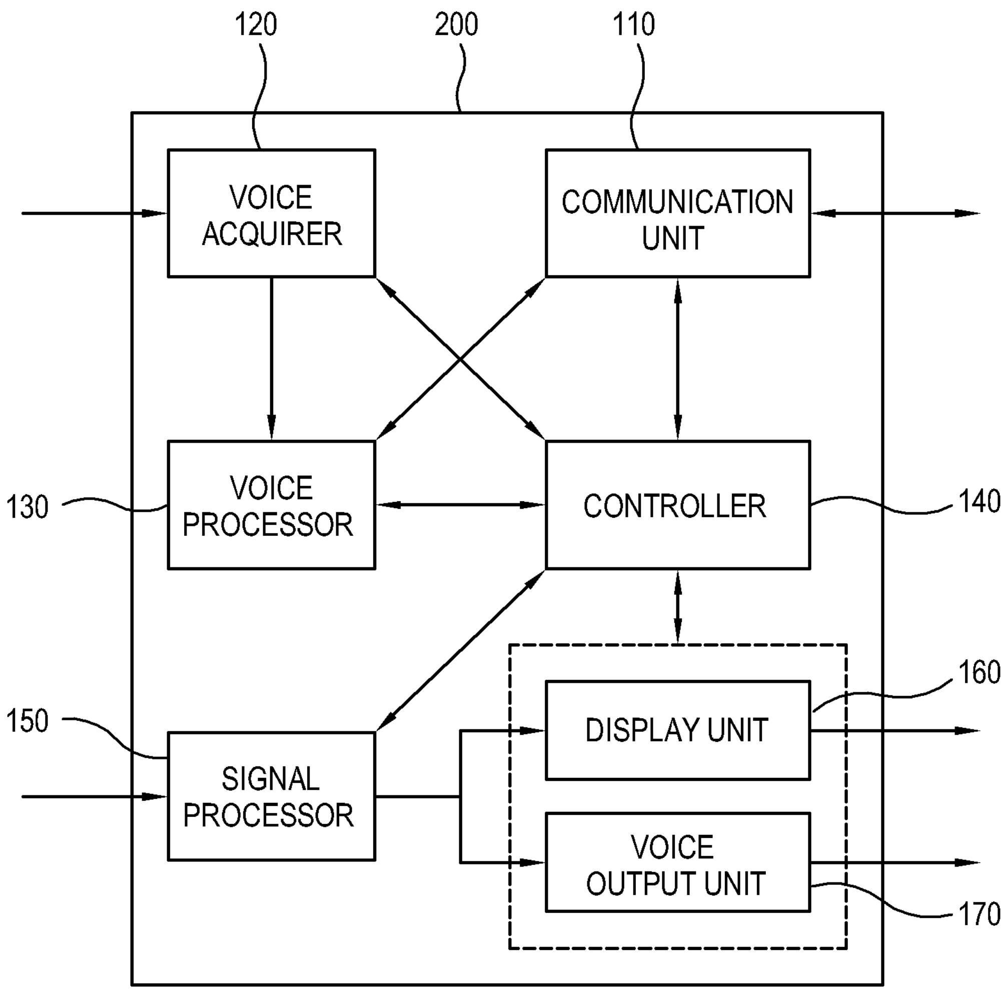

FIG. 3 is a block diagram of a display apparatus 200 as an aspect of the electronic apparatus 100 according to an embodiment.

The display apparatus 200 includes a communication unit 110, a voice acquirer 120, a voice processor 130, a signal processor 150, a display unit 160, a voice output unit 170, and a controller 140 controlling the foregoing components.

The signal processor 150 processes a broadcasting signal transmitted by a transmission apparatus of a broadcasting station or an image/voice signal transmitted by a supply source (not shown) in various forms, according to a preset process. For example, the process of the signal processor 150 may include a de-multiplexing operation to divide a predetermined signal by nature, a decoding operation corresponding to a format of a signal, a scaling operation to adjust an image signal into a preset resolution, etc.

The display unit 160 displays an image thereon based on an image signal output by the signal processor 150, and may be implemented as various displays.

The voice output unit 170 outputs an audio sound based on a voice signal output by the signal processor 150. For example, the voice output unit may be a speaker.

If a voice is output through the voice output unit 170 corresponding to an image displayed by the display unit 160, the controller 140 may control the communication unit 110 to transmit voice information corresponding to the output voice to at least one external electronic apparatus.

The type of the voice information transmitted to the external electronic apparatus corresponding to the output voice includes a waveform level to transmit a waveform of actual voice information or its extraction, a frequency level to analyze a frequency of voice information and transmit the analyzed content, a feature level to extract features and transmit the features to recognize a voice, or a mixed level mixing the foregoing three levels. The foregoing methods may be used to transmit information through a packet.

The packet as a structure of data transmitted and received through the communication interface includes a header field and a data field. The data field may include time information, an output intensity and a voice signal.

For example, if the electronic apparatus 100 receives voice information as second information corresponding to a voice output through the voice output unit 170 from the electronic apparatus 200 and receives a first voice through the voice acquirer 120 of the electronic apparatus 100, the controller 140 determines a degree of similarity between the information of the first and second voices. If there is a predetermined similarity therebetween, the controller 140 may determine that the first voice is not a user's command.

Figure 4:
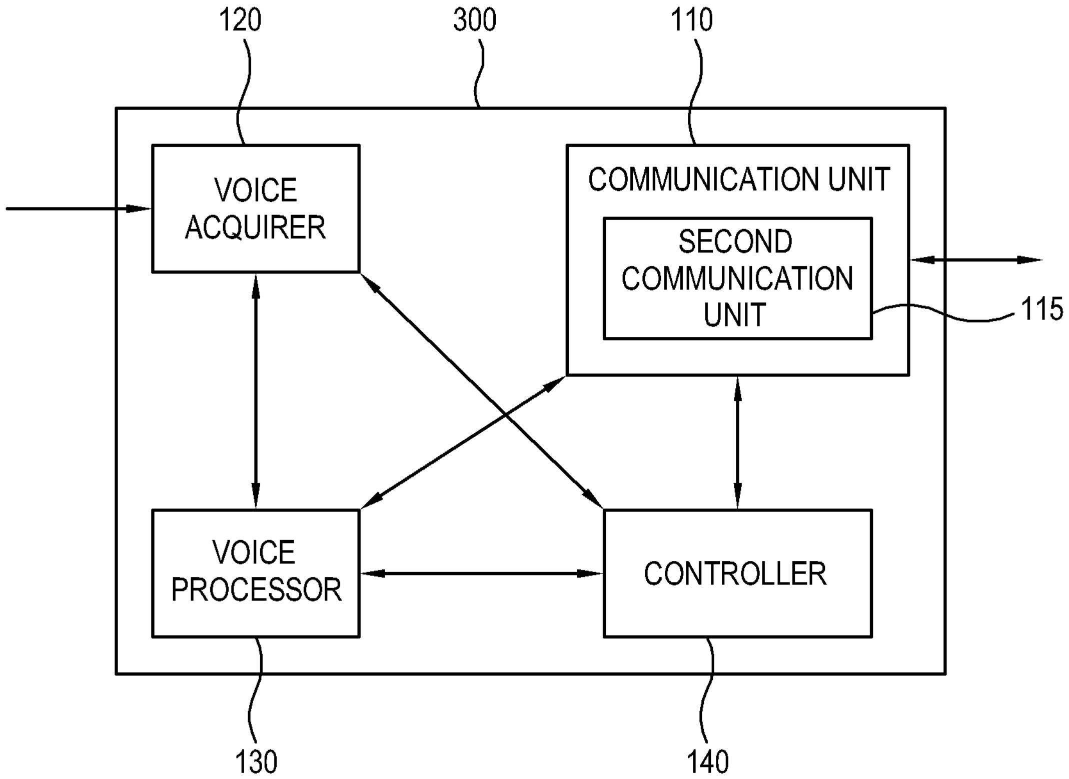

FIG. 4 is a block diagram of a mobile phone 300 as an example of the electronic apparatus 100 according to an embodiment.

The mobile phone 300 includes a communication unit 110, a second communication unit 115 that is included in the communication unit 110, a voice acquirer 120, a voice processor 130, and a controller 140 controlling the foregoing elements.

The second communication unit 115 performs voice communication with an external apparatus (not shown), transmits a calling voice signal input through the voice acquirer 120, and receives a voice signal from the external apparatus. As shown in FIG. 4, the second communication unit 115 according to an embodiment may be included in the communication unit 110 or may be provided separately from the communication unit 110.

When the mobile phone 300 is in a voice call mode, i.e., performs a voice communication through the second communication unit 115, the controller 140 may control the communication unit 110 to transmit voice information to at least one external electronic apparatus based on the calling voice input through the voice acquirer 120.

For example, if the electronic apparatus 100 receives voice information as second voice information from the mobile phone 300 based on the calling voice and receives a first voice through the voice acquirer 120 of the electronic apparatus 100, the controller 140 may determine the degree of similarity between the information of the first and second signals. If it is determined that that is a predetermined similarity therebetween, the controller 140 may determine that the first voice is not a user's command.

The voice acquirer 120 according to an embodiment may receive a user's command granting a right to control the external electronic apparatus. That is, in the electronic apparatus system 10, the electronic apparatus 11 may obtain a control right to remaining electronic apparatuses 12, 13 and 14 according to a user's voice command.

For example, the voice which is input by the voice acquirer 120 may be recognized by the voice processor 130, and the controller 140 may determine that the voice is a command granting a preset control right according to the recognition result.

If the controller 140 determines that the voice is a command granting the right to control the external electronic apparatus, it controls the communication unit 110 to transmit to each external electronic apparatus information notifying that it has obtained the control right to the external electronic apparatus.

If a user's voice is input through the voice acquirer 120, the voice processor 130 recognizes the voice. According to the recognition result of the voice processor 140, the controller 140 determines whether the voice is a voice command with respect to the electronic apparatus 100 or a voice command with respect to the external electronic apparatus.

If it is determined that the voice is a voice command with respect to the electronic apparatus 100, the controller 140 performs an operation corresponding to the voice command. If it is determined that the voice is a voice command with respect to the external electronic apparatus, the controller 140 transmits the voice command to the external electronic apparatus and controls the corresponding external electronic apparatus to perform a voice command.

For example, if an electronic apparatus which has obtained the control right is a mobile phone and a voice such as "TV volume up" is input by the voice acquirer 120, the controller 140 may determine that the voice is a voice command with respect to the external electronic apparatus and transmit the voice command to a TV as the external electronic apparatus.

The communication unit 110 may receive from the external electronic apparatus information notifying that the external electronic apparatus has obtained the control right to the controller 140.

If a voice is input through the voice acquirer 120, the controller 140 determines that the voice is not a user's command and does not perform the corresponding command.

If a user's voice command is transmitted through the communication unit 110 from the external electronic apparatus that has obtained the control right, the controller 140 performs an operation corresponding to the voice command. For example, if a TV receives information notifying that a mobile phone as an external electronic apparatus has obtained a control right to the TV and then receives a voice command such as "volume up" from the mobile phone that has the control right, the controller 140 may increase the output intensity of the voice output by the voice output unit 170, as a corresponding operation.

As one of the plurality of electronic apparatuses is granted the control right to the remaining electronic apparatuses, the electronic apparatus which is not subject to the voice command may be prevented from malfunctioning corresponding to a user's voice command input to the electronic apparatuses.

If a first voice is input by the voice acquirer 120, the controller 140 according to an embodiment may transmit information notifying that the first voice has been input by the voice acquirer 120, to at least one external electronic apparatus.

The communication unit 110 may receive from at least one external electronic apparatus information notifying that the at least one external electronic apparatus has received at least one second voice.

The controller 140 controls the voice processor 130 to recognize the first voice, and makes a predetermined determination on the recognition result. For example, the controller 140 may determine a degree of similarity between the recognition result of the first voice and a voice command in a predetermined pattern which is a basis for the recognition.

The controller 140 controls the communication unit 110 to transmit the determination result of the similarity regarding the first voice to at least one external electronic apparatus.

If the controller 140 receives determination result information on at least one second voice from at least one external electronic apparatus through the communication unit 110, it may determine whether the first voice is a user's command based on the determination result information on at least one second voice.

That is, the controller 140 compares the determination result of the first voice and the determination result information on at least one second voice transmitted through the communication unit 110, and determines whether the first voice is a user's command.

For example, if it is determined that the similarity of patterns of the first voice is about 90% and the determination result of the at least one second voice transmitted by at least one external electronic apparatus is about 80% and 70%, the controller 140 determines that the first voice is a user's command and performs an operation corresponding to the user's command.

Otherwise, if the determination result of the pattern similarity regarding the first voice is 80% and the determination result information on the at least one second voice transmitted by the at least one external electronic apparatus is about 90% and 70%, the controller 140 may determine that the first voice is not a user's command and does not perform the operation corresponding to the first voice.

Accordingly, a malfunction of an unintended electronic apparatus due to an input of the user's voice command may be prevented.

The controller 140 according to an embodiment may determine whether the first voice is a user's command, based on a distance between a location of a user inputting the first voice through the voice acquirer 120 and the electronic apparatus 100 and at least one external electronic apparatus.

If the first voice has been input by the voice acquirer 120, the controller 140 transmits to at least one external electronic apparatus, distance information regarding the first voice, i.e., distance information between a location of a source of the first voice and a location of the voice acquirer 120.

Calculation of the distance from the location where a user speaks, i.e., distance from the location of the voice source may employ various known location calculations.

The communication unit 110 may receive distance information on at least one second voice from at least one external electronic apparatus. The controller may determine the first voice is a user's command based on the received distance information.

For example, the controller 140 compares distance information on the first voice and distance information on at least one second voice. If a distance value of the first voice is the smaller than a predetermined value, the controller 140 determines that the first voice is a user's command and performs an operation corresponding to the first voice.

As the distance information on the second voice input through the voice acquirer of the external electronic apparatus is larger than distance information on the received first voice, at least one external electronic apparatus determines that the input second voice is not a user's voice and does not perform an operation corresponding to the second voice.

The electronic apparatus 100 including the controller 140 and at least one external electronic apparatus may be implemented as display apparatuses, respectively.

For example, if a user gives a voice command to one of a plurality of display apparatuses in a place where a plurality of display apparatuses is provided such as a store selling display apparatuses for home use or places demonstrating functions of products, a display apparatus which is closest to the location of a user may perform a corresponding operation to prevent other adjacent display apparatuses from recognizing the voice command and performing the operation.

The controller 140 according to an embodiment may determine whether the first voice is a user's command based on an angle between a location of a user inputting the first voice through the voice acquirer 120 and the electronic apparatus 100 and at least one external electronic apparatus.

If the first voice has been input by the voice acquirer 120, the controller 140 tracks down a location of the source of the first voice, and transmits angle information on the first voice, i.e., information on an angle between the location of the source of the first voice and the location of the voice acquirer 120.

The communication unit 110 may receive angle information on at least one second voice from at least one external electronic apparatus.

The controller 140 compares angle information on the first voice and angle information on at least one second voice. If the angle value of the first voice is the smallest, the controller 140 determines that the first voice is a user's command and performs an operation corresponding to the first voice.

In this case, as the angle information on the second voice input through the voice acquirer of the external electronic apparatus is larger than the angle information on the received first voice, the at least one external electronic apparatus determines that the input second voice is not a user's command and does not perform an operation corresponding to the second voice.

The electronic apparatus including the controller 140 and at least one external electronic apparatus may be implemented as display apparatuses, respectively.

Accordingly, if an identical user's voice is input to voice acquirers of the plurality of adjacent display apparatuses, respectively, the display apparatus facing the location of a user may perform the operation corresponding to the user's voice.

Hereinafter, a control method of the electronic apparatus 100 according to an embodiment will be described with reference to FIGS. 5 to 8.

Figure 5:
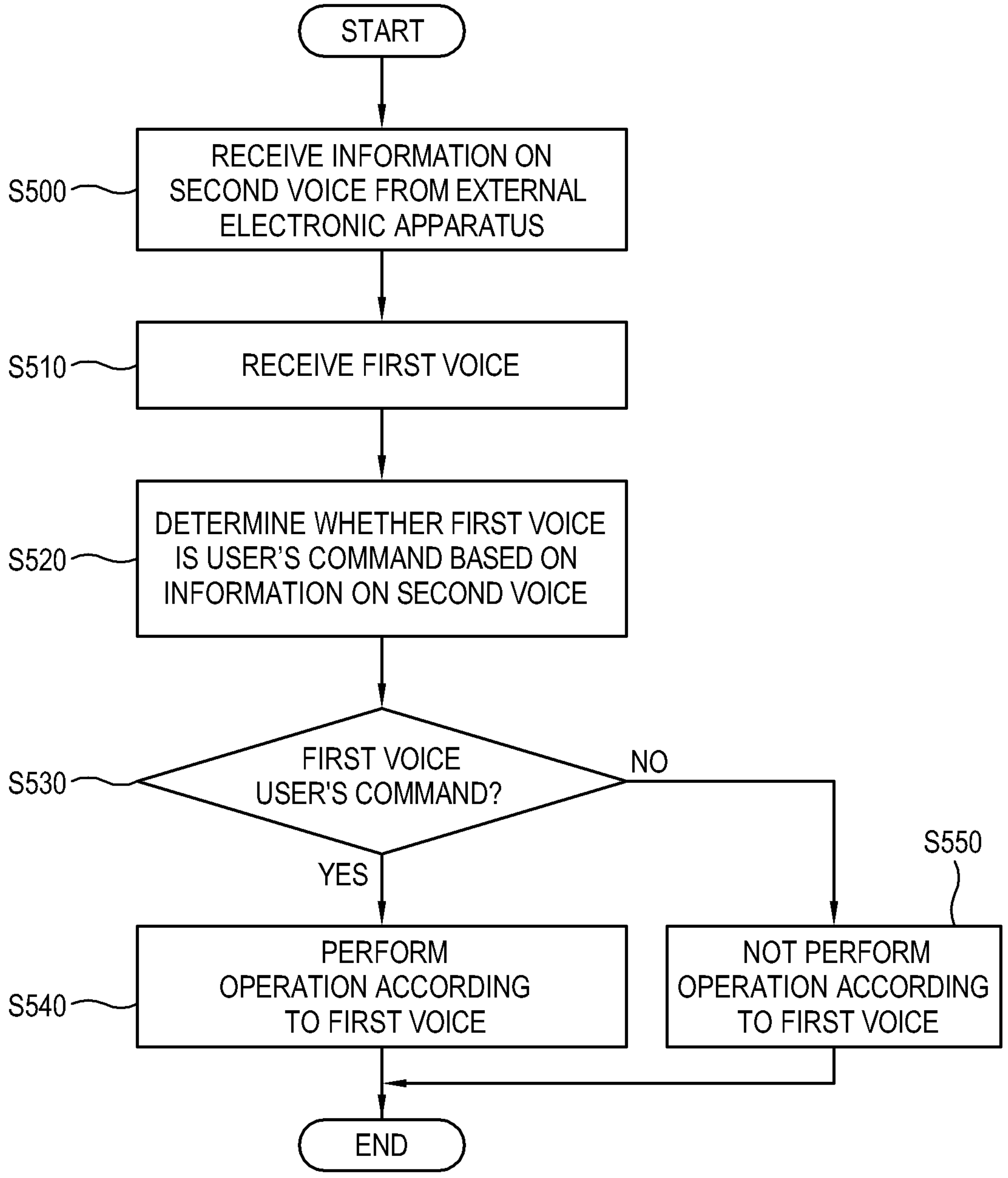
FIGS. 5 to 8 are flowcharts showing a control method of the electronic apparatus in FIGS. 2 to 4.

As shown in FIG. 5, by the control method of the electronic apparatus, information on at least one second voice is transmitted by at least one electronic apparatus (S500). The information on the second voice may include, for example, voice information based on a calling voice of a mobile phone or information on a voice corresponding to the voice output by a voice output unit of a display apparatus or audio apparatus.

The first voice is input by the voice acquirer 120 of the electronic apparatus 100 (S510). The controller 140 determines whether the first voice is a user's command based on the received information on at least second voice (S520). For example, the controller 140 may determine a degree of similarity between the information on at least one second voice and the first voice. If it determined that the first voice is the user's command, the method proceeds to an operation S540, and if it is determined that the first voice is not the user's command, the method proceeds to an operation S550. (S530). For example, if there is a predetermined similarity, the controller 140 may determine that the first voice is not a user's command and does not perform an operation according to the first voice (S540). If there is no predetermined similarity therebetween, the controller 140 determines that the first voice is a user's command, recognizes the first voice and performs an operation according to the recognized first voice which is the user's command (S550).

f the electronic apparatus 100 performs communication for voice call, the calling voice is transmitted to at least one external electronic apparatus. If the electronic apparatus 100 outputs an audio sound through the voice output unit 170, it transmits voice information corresponding to the output voice to at least one external electronic apparatus.

Figure 6:
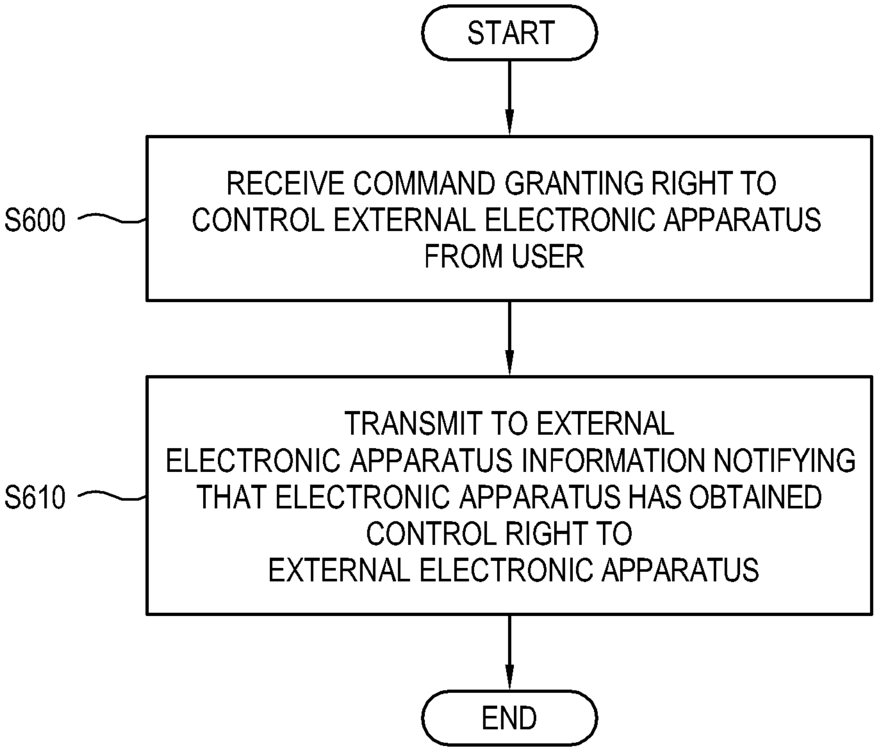

By the control method of the electronic apparatus 100 according to an embodiment, as shown in FIG. 6, the electronic apparatus 100 receives from a user a voice command granting a right to control at least one external electronic apparatus (S600). The electronic apparatus 100 transmits to at least one external electronic apparatus information notifying that the electronic apparatus 100 has obtained the right to control the at least one external electronic apparatus (S610). Upon receiving a voice from a user, the electronic apparatus 100 determines whether the input voice is a voice command with respect to the electronic apparatus 100 or a voice command with respect to at least one external electronic apparatus. If it is determined that the voice is a voice command with respect to the electronic apparatus 100, the operation corresponding to the command is performed. If it is determined that the voice is a voice command with respect to at least one external electronic apparatus, the voice command is transmitted to the corresponding external electronic apparatus. The corresponding external electronic apparatus receives the voice command from the electronic apparatus 100 and performs the operation corresponding to the command.

Figure 7:
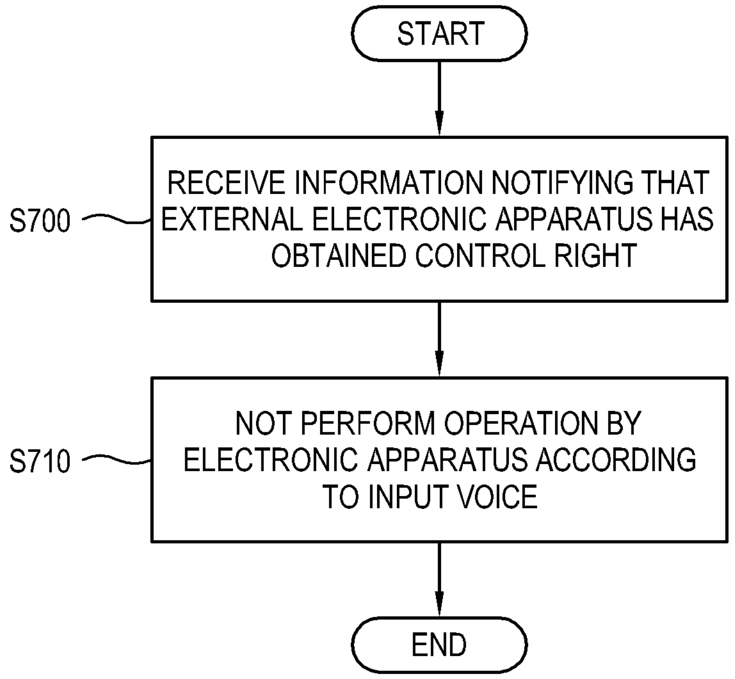

As shown in FIG. 7, the electronic apparatus 100 may receive from one of the at least one external electronic apparatus information notifying that the external electronic apparatus has obtained the right to control the electronic apparatus 100 (S700). The electronic apparatus 100 does not perform an operation corresponding to the voice input through the voice acquirer 120 (S710). The electronic apparatus 100 may receive a voice command from the external electronic apparatus having the control right, and perform the operation according to the voice command.

Figure 8:
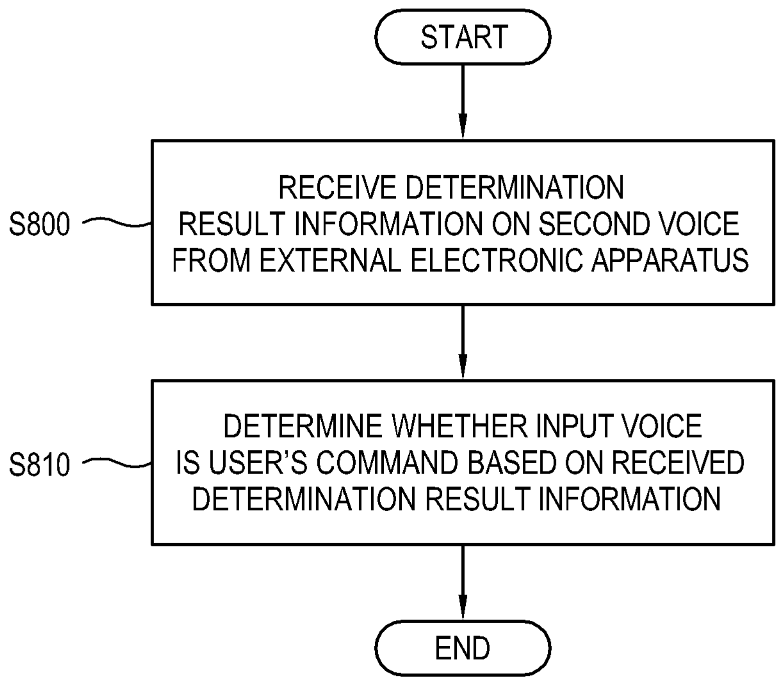

By the control method of the electronic apparatus 100 according to an embodiment, as shown in FIG. 8, the electronic apparatus 100 receives determination result information on at least one second voice from at least one external electronic apparatus (S800). The controller 140 determines whether the voice input by the voice acquirer 120 is a user's command, based on the received determination result information on at least one second voice (S810). That is, the controller 140 may compare the recognition result of the voice input by the voice acquirer 120 and the recognition result of the at least one second voice, and if the first voice is more similar to a predetermined voice command pattern, may determine that the first voice is a user's command.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. An electric apparatus comprising:

a microphone configured to receive an input sound including at least one of a voice input of a user ad a first sound output of at least one external electronic apparatus in vicinity of the electronic apparatus to generate a voice signal corresponding to the input sound;

a first communication circuit configured to communicate with the at least one external electronic apparatus, the voice data being information about the first sound output and in addition to the first sound output that is exchanged between the at least one external electronic apparatus and the first communication circuit while the first sound output is being received by the microphone;

a voice processor configured to process the voice signal generated by the microphone and the voice data received from the first communication circuit; and a controller configured:

to compare the input sound of the voice signal with the voice data of the first sound output; and in response to determining that there is no predetermined similarity between the input sound and the voice data, to control to recognize the voice input included in the input sound, and to perform an operation according to a user's command corresponding to the recognized voice input.

2. The electronic apparatus according to claim 1, further comprising a second communication circuit configured to perform a voice call, wherein the controller is further configured to control the first communication circuit to transmit voice data of the voice input of the user to the at least one external electronic apparatus while the voice call is being performed by the second communication circuit.

3. The electronic apparatus according to claim 1, further comprising a display configured to display an image, and a speaker configured to output a second sound output corresponding to the image displayed on the display, wherein the controller is further configured to control the first communication circuit to transmit voice data of the second sound output to the at least one external electronic apparatus.

4. The electronic apparatus according to claim 1, wherein the controller is further configured to determine whether the command corresponding to the voice input of the user comprises a first command granting a control right to control the at least one external electronic apparatus to the controller, and to control the first communication circuit to transmit information to notify that the controller has obtained the control right to the at least one external electronic apparatus which the controller has obtained the control right of in response to the voice input of the user comprising the first command.

5. The electronic apparatus according to claim 4, wherein the controller which has obtained the control right is further configured to determine whether the command corresponding to the voice input comprises a second command with respect to the at least one external electronic apparatus which the controller has obtained the control right of and to control the first communication circuit to transmit the second command to the at least one external electronic apparatus.

6. The electronic apparatus according to claim 1, wherein the controller is further configured not to perform an operation according to the command corresponding to the voice input of the user in response to receiving information to notify that one of the at least one external electronic apparatus has obtained the control right to control the electronic apparatus.

7. The electronic apparatus according to claim 1, wherein the controller is further configured to determine a first distance between the user and the electronic apparatus and a second distance between the user and the at least one external electronic apparatus, to determine the command corresponding to the voice of the user using the first distance and the second distance.

8. The electronic apparatus according to claim 1, wherein the controller is further configured to determine an angle between the user and the electronic apparatus and to determine the command corresponding to the voice input of the user based on the angle between the user and the electronic apparatus.

9. A control method of an electronic apparatus comprising:

by a microphone, receiving an input sound including at least one of a voice input of a user and a first sound output of at least one external electronic apparatus in vicinity of the electronic apparatus to generate a voice signal corresponding to the input sound;

by a first communication circuit, receiving voice data of the first sound output, from the at least one external electronic apparatus, the voice data being information about the first sound output and in addition to the first sound output that is exchanged between the at least one external electronic apparatus and the first communication circuit while the first sound output is being received by the microphone;

by a controller, comparing the input sound of the voice signal with the voice data of the first sound output; and by the controller, in response to determining that there is no predetermined similarity between the input sound and the voice data, recognizing the voice input included in the input sound, and performing an operation according to a user's command corresponding to the recognized voice input.

10. The control method according to claim 9, further comprising performing a voice call, and transmitting voice data of the voice input of the user to the at least one external electronic apparatus while the voice call is being performed.

11. The control method according to claim 9, further comprising displaying an image, and outputting a second output corresponding to the image; and transmitting voice data of the second sound output to the at least one external electronic apparatus.

12. The control method according to claim 9, further comprising determining whether the command corresponding to the voice input of the user comprises a first command granting a control right to control the at least one external electronic apparatus; and obtaining the control right and transmitting information to notify that the electronic apparatus has obtained the control right to the at least one external electronic apparatus which the electronic apparatus has obtained the control right of in response to the voice input comprising the first command.

13. The control method according to claim 12, further comprising determining whether the command corresponding to the voice input of the user comprises a second command with respect to the at least one external electronic apparatus which the electronic apparatus has obtained the control right of; and transmitting the second command to the at least one external electronic apparatus.

14. The control method according to claim 9, further comprising receiving information to notify that the at least one external electronic apparatus has obtained the control right to control the electronic apparatus; and not performing an operation according to the command corresponding to the voice input of the user.

15. The control method according to claim 9, further comprising, determining a first distance between the user and the electronic apparatus and a second distance between the user and the at least one external electronic apparatus, and determining the command corresponding to the voice input of the user based on the first distance and the second distance.

16. The control method according to claim 9, further comprising determining an angle between the user and the electronic apparatus and determining the command corresponding to the voice input of the user based on the determined angle between the user and the electronic apparatus.

* * * * *